US006599988B2

(12) United States Patent
Wang et al.

(10) Patent No.: US 6,599,988 B2
(45) Date of Patent: Jul. 29, 2003

(54) CENTIPEDE POLYMERS AND PREPARATION AND APPLICATION IN RUBBER COMPOSITIONS

(75) Inventors: Xiaorong Wang, Akron, OH (US); Victor J. Foltz, Akron, OH (US); Hideo Takeichi, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/134,709

(22) Filed: Apr. 29, 2002

(65) Prior Publication Data

US 2002/0161112 A1 Oct. 31, 2002

Related U.S. Application Data

(60) Continuation of application No. 09/724,214, filed on Nov. 28, 2000, now abandoned, which is a division of application No. 08/995,791, filed on Dec. 22, 1997, now Pat. No. 6,248,827.

(51) Int. Cl.[7] ........................ C08L 53/02; C08F 220/08; C08F 220/06; B06C 1/00
(52) U.S. Cl. ................... 525/327.6; 525/91; 525/328.3; 526/262; 152/209.1
(58) Field of Search ................ 525/91, 327.6, 525/328.3; 526/262; 152/209.1

(56) References Cited

U.S. PATENT DOCUMENTS

| | | | |
|---|---|---|---|
| 2,725,367 A | 11/1955 | Niederhauser et al. | |
| 2,971,934 A | 2/1961 | Brown et al. | |
| 3,244,664 A | 4/1966 | Zelinski et al. | |
| 3,281,383 A | 10/1966 | Zelinski et al. | |
| 3,297,654 A | 1/1967 | Barr et al. | |
| 3,414,551 A | 12/1968 | Reid et al. | |
| 3,428,596 A | 2/1969 | Strand et al. | |
| 3,480,580 A | 11/1969 | Joyner et al. | |
| 3,481,910 A | 12/1969 | Brunson et al. | |
| 3,492,227 A | 1/1970 | Kolaian | |
| 3,528,936 A | 9/1970 | Kent et al. | |
| 3,577,365 A | 5/1971 | Folzenlogen et al. | |
| 3,594,452 A | 7/1971 | De La Marre et al. | |
| 3,751,378 A | 8/1973 | Cowperthwaite et al. | |
| 3,761,458 A | 9/1973 | Holler et al. | |
| 3,796,687 A | 3/1974 | Collette et al. | |
| 3,840,449 A | 10/1974 | Furukawa et al. | |
| 3,862,265 A | 1/1975 | Steinkamp et al. | |
| 3,970,608 A | 7/1976 | Furukawa et al. | |
| 3,985,830 A | 10/1976 | Fetters et al. | |
| 3,998,907 A | 12/1976 | Di Giulio | |
| 4,015,612 A | 4/1977 | Pavlik et al. | |
| 4,017,669 A | 4/1977 | Collette et al. | |
| 4,087,485 A | 5/1978 | Huff | |
| 4,104,332 A | 8/1978 | Zelinski | |
| 4,132,531 A | 1/1979 | Cummings et al. | |
| 4,139,417 A | 2/1979 | Marie et al. | |
| 4,151,336 A | 4/1979 | Sackmann et al. | |
| 4,151,337 A | 4/1979 | Kanoh et al. | |
| 4,287,314 A | 9/1981 | Fava | |

(List continued on next page.)

FOREIGN PATENT DOCUMENTS

| | | |
|---|---|---|
| AU | B-47913/85 | 4/1986 |
| CA | 702610 | 1/1965 |
| DE | 3430802 A1 | 3/1986 |
| DE | 42 25 875 A1 | 2/1994 |
| DE | 42 39437 A1 | 5/1994 |
| DE | 42 41 538 A1 | 6/1994 |
| EP | 0 177 401 A1 | 4/1986 |
| EP | 0322 905 A2 | 7/1989 |
| EP | 0 408 470 A1 | 1/1991 |
| EP | 0 440 922 A1 | 8/1991 |
| EP | 0 536 753 A1 | 4/1993 |
| EP | 0 728 767 A1 | 8/1996 |
| GB | 922151 | 3/1963 |
| JP | 6-248017 | 9/1954 |
| JP | 60-243102 | 12/1985 |
| JP | 6-56921 | 3/1994 |
| JP | 8183885 A | 7/1996 |
| JP | 8-255901 | 10/1996 |
| JP | 9012834 A | 1/1997 |
| JP | 9012835 A | 1/1997 |
| WO | WO 96/23007 | 8/1996 |
| WO | WO 97/00898 | 1/1997 |

OTHER PUBLICATIONS

L.E. Colleman, Jr., J.F. Bork, and H. Donn, Jr., J. Org. Chem., 24, 185 (1959) Reaction of Primary Alphatle Amines with Maleic Anhydride.

A. Matsumoto, Y. Oki, and T. Otsu, Polymer J., 23(3), 201 (1991). Sythesis, Thermal Properties and Gas permeability of Poly(N–n–alkylmalemide)s.

L. Haeussler, U. Wienhold, V. Albrecht, and S. Zschoche, Thermochim. Acta, 277, 14(1996). Simultaneous TA and MS analysis of Alternating Styrene–Maleic Anhydride and Styrene–Malemide Copolymers.

W. Kim and K. Seo, Macromol. Rapid Commun., 17, 835(1996). Synthesis and Photocrosslinking of Maleimide–Type Polymers.

W. Lee, and G. Hwong, J. Appl. Polym. Sci., 59, 599 (1996). Polysulfobetaines and Corresponding Cationic Polymers. IV. Synthesis and Aqueous Solution Properties of Cationic Poly (MIQSDMAPM).

I. Vermeesch, and G. Groeninckx, J. Appl. Polym. Sci., 53, 1365(1994). Chemical Modification of Poly(styrene–co–maleic anhydride) with Primary N–Alkylamines by Reactive Extrusion.

*Primary Examiner*—Tae H. Yoon
(74) *Attorney, Agent, or Firm*—Tim Krogh; Scott A. McCollister

(57) ABSTRACT

The instant invention relates to poly(maleimide-co-alkenyl benzene) centipede polymer and a method for producing the polymer by reacting a poly(alkenyl benzene-co-maleic anhydride) in the presence of a primary amine in a substantially dry state. The invention is further directed to a process for blending the poly(maleimide-co-alkenyl benzene) centipede polymer with elastomeric polymers, in combination with, or in substitution of, conventional extender oils, to produce extended polymers having improved properties such as tensile strength, maximum elongation, tear strength, damping properties, and the like.

12 Claims, No Drawings

U.S. PATENT DOCUMENTS

| | | |
|---|---|---|
| 4,304,886 A | 12/1981 | Bean et al. |
| 4,374,951 A | 2/1983 | Lee et al. |
| 4,404,321 A | 9/1983 | Abolins et al. |
| 4,404,322 A | 9/1983 | Saito et al. |
| 4,408,010 A | 10/1983 | Le-Khac |
| 4,423,196 A | 12/1983 | Arlt et al. |
| 4,427,828 A | 1/1984 | Hergenrother et al. |
| 4,502,229 A | 3/1985 | Kitzman |
| 4,506,056 A | 3/1985 | Gaylord |
| 4,540,753 A | 9/1985 | Cozewith et al. |
| 4,585,824 A | 4/1986 | Uchida et al. |
| 4,605,700 A | 8/1986 | Le-Khac |
| 4,683,275 A | 7/1987 | Kato et al. |
| 4,728,463 A | 3/1988 | Sutker et al. |
| 4,732,928 A | 3/1988 | Mizushiro et al. |
| 4,735,992 A | 4/1988 | Nogues |
| 4,771,097 A | 9/1988 | Sackmann et al. |
| 4,772,657 A | 9/1988 | Akiyama et al. |
| 4,889,896 A | 12/1989 | Canova et al. |
| 4,893,055 A | 1/1990 | Fuzii et al. |
| 4,912,144 A | 3/1990 | McCready |
| 4,921,910 A | 5/1990 | Lunt et al. |
| 4,931,502 A | 6/1990 | McCready |
| 4,996,262 A | 2/1991 | Pyke et al. |
| 5,008,324 A | 4/1991 | Killgoar, Jr. et al. |
| 5,034,449 A | 7/1991 | Mallikarjun |
| 5,037,924 A | 8/1991 | Tazi et al. |
| 5,082,913 A | 1/1992 | Tazi et al. |
| 5,122,161 A | 6/1992 | Benfaremo et al. |
| 5,126,403 A | 6/1992 | Graiver et al. |
| 5,156,920 A | 10/1992 | Aycock et al. |
| 5,202,384 A | 4/1993 | Pyke et al. |
| 5,212,227 A | 5/1993 | Sakazume et al. |
| 5,219,628 A | 6/1993 | Hathaway et al. |
| 5,225,498 A | 7/1993 | Sorathia et al. |
| 5,244,971 A | 9/1993 | Jean-Marc |
| 5,247,020 A * | 9/1993 | Nakano et al. |
| 5,256,710 A | 10/1993 | Krivohlavek |
| 5,300,569 A | 4/1994 | Drake et al. |
| 5,318,854 A | 6/1994 | Hamersma et al. |
| 5,356,953 A | 10/1994 | Harada et al. |
| 5,373,048 A | 12/1994 | Witzeman et al. |
| 5,414,044 A | 5/1995 | Moriya et al. |
| 5,432,662 A | 7/1995 | Kato et al. |
| 5,472,741 A | 12/1995 | Sackmann et al. |
| 5,489,657 A | 2/1996 | Sue et al. |
| 5,494,964 A | 2/1996 | Meichsner et al. |
| 5,494,981 A | 2/1996 | Gorodisher et al. |
| 5,508,334 A | 4/1996 | Chen |
| 5,532,316 A * | 7/1996 | Shinmura et al. |
| 5,532,317 A | 7/1996 | Shinmura et al. |
| 5,536,774 A | 7/1996 | Segatta |
| 5,548,031 A | 8/1996 | Doi |
| 5,585,434 A | 12/1996 | DeNicola, Jr. et al. |
| 5,585,436 A | 12/1996 | Niessner et al. |
| 5,602,200 A | 2/1997 | Wissmann |
| 5,618,881 A | 4/1997 | Hojabr |
| 5,634,122 A | 5/1997 | Loucks et al. |
| 5,637,410 A | 6/1997 | Bonner et al. |
| 5,651,927 A | 7/1997 | Auda et al. |
| 5,652,307 A | 7/1997 | Niessner et al. |
| 5,654,364 A | 8/1997 | Bates et al. |
| 5,655,820 A | 8/1997 | Kervagoret |
| 5,658,985 A | 8/1997 | Eichenauer et al. |
| 5,665,820 A | 9/1997 | Leistner et al. |
| 5,670,006 A | 9/1997 | Wilfong et al. |
| 5,684,122 A | 11/1997 | Inoue et al. |
| 5,691,411 A | 11/1997 | Khouri et al. |
| 5,710,228 A | 1/1998 | Krause et al. |
| 5,776,234 A | 7/1998 | Schilling |
| 5,783,630 A | 7/1998 | Evans et al. |
| 5,798,413 A | 8/1998 | Spelthann et al. |
| 5,798,414 A | 8/1998 | Mishima et al. |
| 5,821,032 A | 10/1998 | DoMinh |
| 5,869,695 A | 2/1999 | Ulmer et al. |
| 5,883,188 A | 3/1999 | Hwang et al. |
| 5,905,116 A | 5/1999 | Wang et al. |
| 5,912,296 A | 6/1999 | Wang et al. |
| 5,962,572 A | 10/1999 | Chen |
| 5,965,666 A | 10/1999 | Koo et al. |

\* cited by examiner

CENTIPEDE POLYMERS AND PREPARATION AND APPLICATION IN RUBBER COMPOSITIONS

This application is a continuation of U.S. Ser. No. 09/724,214 filed Nov. 28, 2000, now abandoned, which was a division of U.S. Ser. No. 08/995,791, now U.S. Pat. No. 6,248,827, filed Dec. 22, 1997.

BACKGROUND OF THE INVENTION

The polymerization of styrene and maleic anhydride by free radical initiation is well known in the prior art. Similarly, poly(styrene-co-maleic anhydride) and poly (styrene-alt-maleic anhydride) polymers are well known. Further, imidization between a maleic anhydride and a primary amine group is a commonly known chemical reaction. Publications which have recognized these reactions include: German Patent DE 4241538, assigned to Leuna-Werke A. -G; Japanese Patent JP 94248017, assigned to Monsanto Kasel Kk.; and, Italian Patent EP 322905 A2, assigned to Montedipe S.p.A. Various other non-patent publications have also recognized these reactions. Included among them are: L. E. Colleman, Jr., J. F. Bork, and H. Donn, Jr., J. Org. Chem., 24, 185(1959); A. Matsumoto, Y. Oki, and T. Otsu, Polymer J., 23(3), 201(1991); L. Haeussler, U. Wienhold, V. Albricht, and S. Zschoche, Themochim. Acta, 277, 14(1966); W. Kim, and K. Seo, Macromol. Rapid Commun., 17, 835(1996); W. Lee, and G. Hwong, J. Appl. Polym. Sci., 59, 599(1996); and, I. Vermeesch and G. Groeninckx, J. Appl. Polym. Sci., 53, 1356 (1994).

The synthesis of monofunctional N-alkyl and N-aryl maleimides are also well known in the prior art. They have been extensively used to improve the heat stability of homopolymers and especially copolymers prepared from vinyl monomers. Typically, the bulk resins comprise ABS (poly-(acrylonitrile-co-butadiene-co-styrene)) or a polyblend of poly-(acrylonitrile-co-butadiene) and poly-(styrene-co-acrylonitrile); PVC (poly(vinyl chloride)); SAN (poly(styrene-co-acrylonitrile)); PMMA (poly-(methyl methacrylate)); and the like. The maleimides can be copolymerized with other monomers such as acrylonitrile, butadiene, styrene, methyl methacrylate, vinyl chloride, vinyl acetate and many other comonomers. A more preferred practice in the industry is to produce copolymers of maleimides with other monomers such as styrene and optionally acrylonitrile and to blend these with ABS and SAN resins. In any event, the polymer compositions are adjusted so that the copolymers are fully compatible with the bulk resins (e.g., ABS and/or SAN) as shown by the presence of a single glass transition point ($T_g$) as determined by differential scanning calorimetry (DSC).

It has long been recognized that two or more polymers may be blended together to form a wide variety of random or structured morphologies to obtain products that potentially offer desirable combinations of characteristics. However, it may be difficult or even impossible in practice to achieve many potential combinations through simple blending because of some inherent and fundamental problem. Frequently, the two polymers are thermodynamically immiscible, which precludes generating a truly homogeneous product. This immiscibility may not be a problem per se since often it is desirable to have a two-phase structure. However, the situation at the interface between these two phases very often does lead to problems. The typical case is one of high interfacial tension and poor adhesion between the two phases. This interfacial tension contributes, along with high viscosities, to the inherent difficulty of imparting the desired degree of dispersion to random mixtures and to their subsequent lack of stability, giving rise to gross separation or stratification during later processing or use. Poor adhesion leads, in part, to the very weak and brittle mechanical behavior often observed in dispersed blends and may render some highly structured morphologies impossible.

The abrasion resistance of rubbers generally increases with increasing molecular weight. However, viscosity of the unvulcanized rubber also increases with increase in molecular weight. Accordingly, in conventional practice a plasticizer ("extending oil") is added to the unvulcanized rubber to lower its viscosity and to increase its workability to a point suitable for extrusion or other processing.

Kent et al in U.S. Pat. No. 3,528,936 and Cowperthwaite et al in U.S. Pat. No. 3,751,378 recognize that high molecular weight polymers of butadiene, etc., may be plasticized by addition of certain polyester monomers. Both patents teach admixture of the monomer and polymer together with an inorganic filler and other ingredients on an open mill or in an internal mixer, i.e., "dry" blending with a filler.

It is particularly desirable to prepare a polymer useful as an oil substitute that performs the function of a polymer extender or plasticizer while enhancing beneficial polymer properties such as tensile strength, maximum elongation, tear strength, damping properties.

OBJECTS OF THE INVENTION

It is an object of this invention to produce a poly (maleimide-co-alkenyl benzene) "centipede" polymer formed by imidizing a poly(alkenyl benzene-co-maleic anhydride). The "centipede" polymer has a high molecular weight spine connected with many relatively short side chains. The length of the main chain usually equals or is longer than the entanglement length, which is herein defined theoretically as an order of magnitude of 100 repeating units, while the length of the side chains is much smaller than the entanglement length.

Still more specifically, it is an object of the invention to provide a centipede polymer formed by imidizing a poly (styrene-co-maleic anhydride) with a primary amine to form a poly(maleimide-co-styrene) polymer.

It is a further object of the present invention to produce a high molecular weight poly(maleimide-co-alkenyl benzene) polymer formed by the reaction product of a maleic anhydride contributed monomer unit of a poly(alkyl benzene-co-maleic anhydride) and a primary amine containing from 1 to 50 carbon atoms in the alkyl and alkoxy substituents in the primary amine.

It is another object of the invention is to produce a high molecular weight poly(maleimide-co-alkenyl benzene) polymer useful as an oil substitute to be used as an a polymer extender that enhances beneficial polymer properties such as tensile strength, maximum elongation, tear strength, damping properties, and the like.

Finally, it is yet another object of the invention is to produce a centipede polymer that exhibits improved properties such as tensile strength, maximum elongation, tear strength, damping properties, and the like; that can be employed as a substitute for oils and/or plasticizers in the production of various other rubber compounds.

SUMMARY OF THE INVENTION

The present invention is broadly directed to poly (maleimide-co-alkenyl benzene) centipede polymer compositions formed by reacting a poly(alkenyl benzene-co-maleic anhydride) with a primary amine. It is further directed to a process for blending the poly(maleimide-co-alkenyl benzene) centipede polymer with elastomeric polymers, in combination with, or in substitution of, conventional extender oils, to produce extended polymers having improved properties such as tensile strength, maximum elongation, tear strength, damping properties, and the like.

DETAILED DESCRIPTION OF THE INVENTION

The present invention is broadly directed to a polymer compositions of a poly(alkenyl benzene-co-maleimide) formed by reacting a poly(alkyl benzene-co-maleic anhydride) with a primary amine.

For the purposes of this invention, poly(alkenyl benzene-co-maleimide) and poly(alkyl benzene-co-maleic anhydride) are defined to encompass random and stereo-specific copolymers, including copolymers having alternating alkenyl benzene and maleimide or maleic anhydride contributed monomer units along the polymer backbone. Such alternating structure are typically described as poly (alkenyl benzene-adj-maleimide) and poly(alkyl benzene-adj-maleic anhydride), however, these polymers are encompassed herein within the descriptions poly(alkenyl benzene-co-maleimide) and poly(alkyl benzene-co-maleic anhydride)

Processes for forming poly(alkyl benzene-co-maleic anhydride) polymers are well known to those skilled in the art. The preparation of the copolymers from electron donor monomers, such as styrene, and electron acceptor monomers, such as maleic anhydride, as a result of complexation of the electron acceptor monomers may be carried out in the absence as well as in the presence of an organic free radical initiator in bulk, or in an inert hydrocarbon or halogenated hydrocarbon solvent such as benzene, toluene, hexane, carbon tetrachloride, chloroform, etc. (N. G. Gaylord and H. Antropiusova, Journal of Polymer Science, Part B, 7, 145 (1969) and Macromolecules, 2, 442 (1969); A. Takahashi and N. G. Gaylord, Journal of Macromolecular Science (Chemistry), A4, 127 (1970).

Poly(alkyl benzene-co-maleic anhydride) polymers are prepared by reacting monomers of alkenylbenzene with maleic anhydride. The preferred alkenyl benzene monomers used for forming the poly(alkyl benzene-co-maleic anhydride) polymer are styrene or α-methylstyrene. Suitable, but less preferred substitutes are: p-methylstyrene, 4-phenylstyrene, m-methylstyrene, o-methylstyrene, p-tert-butylstyrene, dimethylstyrene, and combinations thereof.

The poly(alkyl benzene-co-maleic anhydride) for use in the present invention is a polymer containing from about 5 to 99 mole percent of maleic anhydride monomer with the remainder being alkyl benzene monomer. The preferred poly(alkyl benzene-co-maleic anhydride) contains from 20 to 50 mole percent of maleic anhydride monomer. The most preferred poly(alkyl benzene-co-maleic anhydride) for use in the present invention is poly(styrene-co-maleic anhydride) containing 50 mole percent of maleic anhydride monomer and 50 mole percent of styrene monomer. The comonomers, maleic anhydride and alkenyl benzene, can be randomly or alternatingly distributed in the chain, however, it is preferred to have these comonomers alternating along the polymer backbone chain.

The poly(alkenyl benzene-co-maleic anhydride) has a molecular weight range between about 1,000 and up to about 500,000 or higher, more typically between about 10,000 and 500,000, and even more typically between about 150,000 and 450,000, where the molecular weight is weight-average ("$M_w$").

The poly(maleimide-co-alkenyl benzene) of the instant invention is formed by reacting a poly(alkyl benzene-co-maleic anhydride) in the presence of a mono-primary amine at a temperature from about 100° C. to about 300° C. and at a pressure from about slightly above vacuum to about 20 atmospheres, under substantially dry conditions. The reactants are preferably dry mixed in the absence of solvents in a suitable mixing apparatus such as a Brabender mixer equipped with Banbury blades. It is preferable to purge the mixer with nitrogen prior to the charging of the reactants. The primary amine may be added in a singular charge or in sequential partial charges into a reactor containing a charge of poly(alkyl benzene-co-maleic anhydride). Preferably the primary amine is charged in ratio between 0.8 to 1.0 of moles of amine per monomer contributed units of maleic anhydride in the poly(alkyl benzene-co-maleic anhydride).

Suitable primary amine include but are not limited to: alkyl amines; alkyl benzyl amines; alkyl phenyl amines; alkoxybenzyl amines; alkyl aminobenzoates; alkoxy aniline; and other linear primary amines containing from 1 to 50 carbon atoms, preferably 6 to 30 carbon atoms, in the alkyl and alkoxy substituents in these primary amines. It is understood that the alkyl and alkoxy substituents on the above discussed primary amines can be linear or branched, preferably linear, and saturated or unsaturated, preferably saturated. Exemplary, but not exclusive of such amines are: hexylamine, octylamine, dodecylamine and the like.

The poly(maleimide-co-alkenyl benzene), preferably has a molecular weight range between about 1,000 and up to about 500,000 or higher, more typically between about 10,000 and 500,000, and even more typically between about 150,000 and 450,000, where the molecular weight is weight-average ("$M_w$").

The poly(maleimide-co-alkenyl benzene) centipede polymers of the present invention can be employed as high damping additives and as an alternative for plasticizers or oils in the formulation of various rubber compounds or elastomeric polymers.

The centipede polymer of the present invention may be prepared by any means well known in the art for combining such ingredients, such as blending, milling or internal batch mixing. A rapid and convenient method of preparation comprises heating a mixture of the components to a temperature of about 50° C. to about 290° C.

The centipede polymers of this invention are preferably manufactured by mixing and dynamically heat-treating the components described above, namely, by melt-mixing. As for the mixing equipment, any conventional, generally known equipment such as an open-type mixing roll, closed-type Banbury mixer, closed type Brabender mixer, extruding machine, kneader, continuous mixer, etc., is acceptable. The closed-type Brabender mixer is preferable, and mixing in an inactive gas environment, such as nitrogen or carbon dioxide, is also preferable.

In accordance with the present invention, the centipede polymer composition of the present invention may be added as an extender or as a plasticizer to an elastomeric polymer in an amount ranging from about 0.5–200 parts by weight per 100 parts by weight of a solid elastomeric polymer; preferably in an amount ranging from about 0.1 to about 50 parts by weight of centipede polymer per 100 parts by weight of the elastomeric polymer to be extended. Most preferred amounts of added centipede polymer include from about 0.5 to about 20 parts of centipede polymer per 100 parts of the elastomeric polymer. These parts by weight being effective plasticizing amounts of centipede polymer in elastomers.

Typical, but by no means limited to the types of thermodynamically miscible elastomeric polymers and copolymers that may be compatibly blended and extended by the centipede polymers of the present invention are elastomeric polymer containing formulations include but not limited to: natural rubber, polyisoprene, polybutadiene, butadiene/styrene rubber (SBR), ethylene/propylene copolymer rubbers and blends thereof. SBR and polybutadiene are preferred elastomers.

The use of poly(maleimide-co-alkenyl benzene) centipede polymers produced according to the present invention as plasticizers for elastomeric polymers either alone or as a partial oil substitute increases the damping properties of the elastomeric polymers over comparable oil extended polymers. The use of the centipede polymers as an extender in elastomeric polymers also increases the tensile strength, the maximum elongation, tear strength and the travel at tear characteristics versus elastomers extended with a comparable amount of oil extender.

Although the present invention also contemplates use of the instant centipede polymers in combination with conventional extender oils, an embodiment contemplates the total substitution of conventional extenders by centipede polymers. Typical prior art extenders replaced by the instant centipede polymers include extender oils and low molecular weight compounds or components. Such extender oils include those well known in the art such as naphthenic, aromatic and paraffinic petroleum oils and silicone oils. Examples of low molecular weight organic compounds or components extenders in the compositions that may be replaced by the centipede polymers of the present invention are low molecular weight organic materials having a number-average molecular weight of less than 20,000, preferable less than 10,000, and most preferably less than 5,000. Although there is no particular limitation to the material that the instant centipede polymers replace in prior art rubber compounds, the following is a list of examples of appropriate replaceable materials: (1) softening agents, namely aromatic, naphthenic and paraffinic oil softening agents for rubbers or resins; and (2) plasticizers, namely plasticizers composed of esters including phthalic, mixed phthalic, aliphatic dibasic acid, glycol, fatty acid, phosphoric and stearic esters, epoxy plasticizers, other plasticizers for plastics; and (3) petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins. The instant centipede polymers can be used to replace or partially replace one or more or all of these extender materials.

Additives useful in the compositions of the present application as well known in the rubber art. Stabilizers, antioxidants, conventional fillers, reinforcing agents, reinforcing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl) phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product, preferably in the range of 1 to 350 parts of additives or compounding ingredients per 100 parts of the elastomeric polymer.

A reinforcement may be defined as the material that is added to a the elastomeric compositions to improve the strength of the centipede extended elastomeric polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Other elastomers and resins are also useful to enhance specific properties like damping properties, adhesion and processability. Examples of other elastomers and resins include adhesive-like products including Reostomer (produced by Riken-Vinyl Inc.), hydrogenated polystyrene-(medium or high 3,4) polyisoprene-polystyrene block copolymers such as Hybler (produced by Kurare Inc.), polynorbornenes such as Norsorex (produced by Nippon Zeon Inc.) and the like.

The centipede extended elastomer compositions obtained using the manufacturing method of this invention can be molded with equipment conventionally used for molding thermoplastics. These centipede extended elastomer compositions are suitable for extrusion molding, calendar molding, and particularly injection molding. These compositions can be mixed in any conventional mixer such as a Brabender mixer, a Banbury mixer or roll mill or extruder normally conducted within the temperature range of about 100° C. to about 300° C., preferably maintaining the composition above its melting point for a few minutes up to several hours, preferably 10 to 40 minutes. A particularly useful technique is to add any fillers in the beginning of the mixing cycle in order to take maximum advantage of heating time and to prevent surface bleeding and overheating when forming the molded articles.

The centipede extended elastomeric polymer formulations may be molded in appropriate press ovens and the like to form products in the form of extruded pellets, cut dices, preferably as small as possible since smaller pellets provide short heating times and better flow when utilized in flow molding. Ground pellets may also be utilized.

In summary, the poly(maleimide-co-alkenyl benzene) centipede extended elastomeric polymer formulations of the instant invention can be used in high temperature applications including uses in injection molding or in any other compositions typically for elastomeric properties. The use of the centipede polymers as an extender in elastomeric polymers increases the tensile strength, the maximum elongation, tear strength and the travel at tear characteristics versus elastomers extended with a comparable amount of oil extender.

Damping is the absorption of mechanical energy by a material in contact with the source of that energy. It is desirable to damp or mitigate the transmission of mechanical energy from, e.g., a motor, engine, or power source, to its surroundings. Elastomeric materials are often used for this purpose. It is desirable that such materials be highly effective in converting this mechanical energy into heat rather than transmitting it to the surroundings. It is further desirable that this damping or conversion is effective over a wide range of temperatures and frequencies commonly found near motors, automobiles, trucks, trains, planes, and the like.

A convenient measurement of damping is the determination of a parameter called tan δ. A forced oscillation is applied to a material at frequency f and the transmitted force and phase shift are measured. The phase shift angle delta is recorded. The value of tan δ is proportional to the ratio of (energy dissipated)/(energy stored). The measurement can be made by any of several commercial testing devices, and may be made by a sweep of frequencies at a fixed temperature, then repeating that sweep at several other temperatures, followed by the development of a master curve of tan δ vs. frequency by curve alignment. An alternate method is to measure tan δ at constant frequency (such as at 10 hz) over a temperature range. We have defined an unfilled material as useful for damping when tan δ>~0.3 over at least a 4 decade range, preferably a 6 decade range of frequency.

It is further important that this high degree of absorption of energy be accompanied by good mechanical and thermal stability, as the part prepared from the subject centipede extended polymers will be cycled through various environments and repeatedly such to various forces of compression, tension, bending, and the like.

The compositions of the present invention are favorably used in the manufacturing of any product in which the following properties are advantageous: a high degree of softness, heat resistance, decent mechanical properties, elasticity and/or high damping. The compositions of the present invention can be used in all industry fields, in particular, in the fabrication of automotive parts, tire tread rubbers, household electrical appliances, industrial machinery, precision instruments, transport machinery, constructions, engineering, and medical instruments.

Representative examples of the uses of the instant centipede extend elastomeric polymers are damping materials, and vibration restraining materials. These uses involve connecting materials such as sealing materials, packing, gaskets and grommets, supporting materials, such as mounts, holders and insulators, and cushion materials such as stoppers, cushions, and bumpers. These materials are also used in equipment producing vibration or noise and household electrical appliances, such as in air-conditioners, laundry machines, refrigerators, electric fans, vacuums, driers, printers and ventilator fans. Further, these materials are also suitable for impact absorbing materials in audio equipment and electronic or electrical equipment, sporting goods and shoes.

In the following, the present invention will be described in more detail with reference to non-limitative examples. The following examples and tables are presented for purposes of illustration only and are not to be construed in a limiting sense.

Preparation of Centipede Polymer

EXAMPLE 1

A nitrogen purged Brabender mixer (~310 gram capacity) equipped with a Banbury blade was initially set to 30 rpm and the temperature was set to 165° C. The mixer was then charged with 150 g of poly(styrene-alt-maleic anhydride) (obtained from Aldrich Chemical Company of 1001 West Saint Paul Avenue, Milwaukee, Wis. Catalog Number: 18,293-1, CAS Number: 9011-13-6)($M_n$=350,000) and 34.5 g of dodecyl amine (obtained from Aldrich, 98% purity). The contents of the mixer was then agitated for 10 minutes and then a charge of another 34.5 g of dodecyl amine was added to the mixer. This procedure was repeated 3 times until a total of 138 g of dodecyl amine had been added to the mixer. After 30 minutes of continuous mixing, the agitation speed was reset to 60 rpm and the temperature was reset to 205° C. Agitation was continued for an additional 65 minutes. Agitation was thereafter reset to 15 rpm and the heating element of the mixer was turned off, and the polymer mass within the mixer was permitted to cool down to 150° C. at a rate of ~4° C./min. The agitation was then stopped and the centipede polymer product mass was then removed from the mixer.

IR absorption peaks characteristic of the centipede polymer mass were noted substantially only at 704 $cm^{-1}$, 1701 $cm^{-1}$, 1772 $cm^{-1}$, 2852 $cm^{-1}$ and 2923 $cm^{-1}$. The ratio of the intensities was observed at $I_{2923}$ to $I_{1701} \cong 0.8$. Further, an NGR analysis ($^1H$ and $^{13}C$) indicated that the imidization reaction within the product mass had achieved a 100% completion. It was not possible to define the $T_g$ value since the characteristic $T_g$ transition is very broad when using DSC. No step change in heat capacity was noted (i.e., ΔCp. vs. Temperature).

EXAMPLE 2

The same nitrogen purged Brabender mixer (~310 g capacity) equipped with a Banbury blade of foregoing Example 1 was initially set to 30 rpm and the temperature was set to 80° C. The mixer was then charged with 150 g of poly(styrene-alt-maleic anhydride) (obtained from Aldrich, $M_n$=350K) and 96 g of octyl amine (obtained from Aldrich, 99% purity). After 5 minutes, the mixture was permitted to heat up at a rate of 4° C./min. Once the temperature of the mixture reached 140° C., the agitation was discontinued. When the temperature of the mixture rose to 250° C., the heating element of the mixer was set to isothermal mode and the agitation was resumed at a speed of 30 rpm. After 5 minutes of continuous mixing, the agitation speed was reset to 70 rpm and the temperature was reset to 210° C. Agitation was continued for an additional 65 minutes. The heating element of the mixer was then turned off, and the polymer mass within the mixer was permitted to cool down at a rate of ~4° C./min. The agitation was then turned off and the centipede polymer product mass, while at temperature of 160° C., was then removed from the mixer.

IR absorption peaks characteristic of the centipede polymer mass were noted substantially only at 705 $cm^{-1}$, 1701 $cm^{-1}$, 1770 $cm^{-1}$, 2855 $cm^{-1}$ and 2926 $cm^{-1}$. The ratio of the intensities was observed at $I_{2926}$ to $I_{1701} \cong 0.55$. Further, an NGR analysis ($^1H$ and $^{13}C$) indicated that the imidization reaction within the product mass had achieved a 100% completion (i.e., no traces of maleic anhydride peaks at 1770 $cm^{-1}$ and 1855 $cm^{-1}$; and, amino group peaks at 3330 $cm^{-1}$). Although the DSC characteristic $T_g$ transition was very broad, between –50° C. to 75° C., the $T_g$ was estimated at 60° C.

EXAMPLES 3–9

Application of Centipede Polymers in Rubber Compounds

In Examples 3 to 9, rubber compositions were prepared according to the formulation as displayed in parts by weight as shown in Table 1. In Examples 4 to 8 the centipede polymer of Example 1 was used to at least partially replace that amount of aromatic oil normally used, as shown in Table 3. Although the respective amounts of aromatic oil and centipede polymer were varied, the sum of the respective amounts (18.25 parts by weight) was kept constant in all compounds. The rubber compound used in the formulation in Table 1 was an oil-extended high-styrene SBR (20 phr aromatic oil) which contained 33% bound styrene with a $T_g$=−47° C. The cis-BR used was a high-cis polybutadiene with a cis content=96%. In each sample, the components were kneaded by the method indicated in Table 2. The final stock was sheeted and molded at 165° C. for ~15 minutes. For each of the sample vulcanized rubber compounds of Examples 3 to 9, measurements of the tensile strength; tear strength; and, hysteresis loss were taken. The results of these measurements appears in Table 3. Measurements of tensile strength were based upon the conditions of ASTM-D 412 at 22° C. Test specimen geometry was taken in the form of a ring having a width of 0.05 inches and a thickness of 0.075 inches. The specimen was tested at a specific gauge length of 1.0 inches. The measurement of tear strength is based on conditions of ASTM-D 624 at 170° C. Test specimen geometry was also taken in the form of a nicked ring in accordance with the conditions defined in ASTM-624-C. The specimen was tested at the specific gauge length of 1.750 inches. The hysteresis loss was measured with a Dynastat Vicoelastic Analyzer. The test specimen geometry was also taken in the form of a cylinder of a length of 0.6125 inches and a diameter of 0.375 inches. The specimen was tested at a frequency of 1 Hz and a temperature of 50° C. A static mass of 2.0 Mpa and a dynamic mass of 2.50 MPa were applied for the test. As can be seen in Table 3, the rubber compositions of Examples 4–8 exhibited very well balanced: tensile strengths; tear strengths; and, damping properties. An evaluation of the resistance of the samples was obtained by weighing the amount of wear. Assuming all considerations were based upon the same modulus condition, no significant differences were observed between the test samples and the comparative samples.

Accordingly, it was concluded that the polymers developed according to the instant invention (as shown in samples 1–2) are suitable as high damping additives in rubber compounds. It was further concluded that these polymers could be used as alternative substitutes for oils and/or plasticizers.

TABLE 1

| | |
|---|---|
| Styrene-Butadiene Rubber (SBR, Duradene 753) | 96.80 |
| Butadiene Rubber (cis-BR, Diene 600) | 20.00 |
| Carbon Black (ISAF) | 70.00 |
| Aromatic Oil | 18.25 |
| Stearic Acid | 2.00 |
| Wax | 1.50 |
| Antioxidant [N-(1,3 dimethybutyl)-N'-phenyl-p-phenylene-diamine] | 0.95 |
| Sulfur | 1.70 |
| Accelerator [N-tert-butyl-benzothiazolesulfenamine] | 0.80 |
| Zinc Oxide | 2.00 |
| Antioxidant [polymerized 1,2-dihydro-2,2,4-trimethylquioline] | 0.22 |
| Accelerator (benzothiazyl disulfide) | 0.20 |
| Accelerator (tetra-methylthiuram monosulfide) | 0.20 |

TABLE 2

| | |
|---|---|
| Mixer | 310 g Brabender |
| Agitation Speed | 60 rpm |
| Mater Batch Stage | |
| Initial Temperature | 110° C. |
| 0 sec | charging polymers |
| 30 sec | charging carbon black and all pigments |
| 5 min | drop |
| Remill Batch Stage | |
| Initial Temperature | 110° C. |
| 0 sec | charging mater batch stock |
| 4 min | drop |
| Final Batch Stage | |
| Initial Temperature | 75° C. |
| 0 sec | charging remilled stock |
| 30 sec | charging curing agent and accelerators |
| 80 sec | drop |

TABLE 3

| Example No. | Polymer used: Ex 1 (parts by weight) | Sulfur used (parts by weight) | Tensile strength (psi) | Maximum elongation (%) | Tear strength (psi) | Travel at Tear (%) | Tan δ at 50° C. |
|---|---|---|---|---|---|---|---|
| 3 (comp.) | 0 | 1.7 | 2928 | 564 | 209.4 | 326.4 | 0.245 |
| 4 | 5 | 1.7 | 3264 | 598 | 290.0 | 409.1 | 0.255 |
| 5 | 10 | 1.7 | 2876 | 564 | 304.8 | 423.2 | 0.274 |
| 6 | 15 | 1.7 | 2916 | 549 | 325.6 | 431.8 | 0.308 |
| 7 | 8 | 1.7 | 3212 | 573 | 294.5 | 403.6 | 0.253 |
| 8 | 12 | 1.7 | 3147 | 605 | 311.7 | 426.9 | 0.293 |
| 9 (comp.) | 0 | 2.0 | 3166 | 535 | 237.8 | 315.4 | 0.221 |

Table 3 shows a series of seven examples wherein a damping polymer that was extended only by conventional extender oils in comparative Examples 3(comp) and 9(comp)), was compared to the same damping polymer extended with varying proportions of the instant centipede polymer to conventional extender oils while maintaining a constant total extender oil weight proportion of 18.25 parts by weight of extender. For example, Example 3 contained 18.25 parts by weight of aromatic oil while Example 4 contained 13.25 parts by weight of aromatic oil and 5 parts by weight of centipede polymer as prepared in Example 1. Substantial improvements can be noted in the examples that were partially extended with the centipede polymer of the present invention, with respect to tensile strength, tear strength, travel at tear and tan δ at 50° C.

Although the invention has been described with reference to particular means, materials and embodiments it is to be understood that the invention is not limited to the particulars disclosed and extends to all equivalents within the scope of the claims.

We claim:

1. A method for forming a vibration damper or tire tread, said method comprising mixing together:
   a) an elastomer,
   b) 0.1–50 pbw fully imidized copolymer per 100 pbw said elastomer, said copolymer comprising units contributed from
      1) an alkenyl benzene and
      2) a maleimide, said copolymer acting as an extender material for said elastomer; and
   c) optionally an inorganic filler, additive, or compounding ingredient, said composition being free of conventional extenders for elastomers.

2. The method of claim 1 wherein said copolymer is linear.

3. The method of claim 1 wherein said elastomer comprises natural rubber, polyisoprene, polybutadiene, styrene/butadiene rubber, or ethylene/propylene copolymer rubber.

4. The method of claim 1 wherein said alkenyl benzene comprises styrene, α-methylstyrene, tert-butlystyrene, p-methylstyrene, 4-phenylstyrene, m-methylstyrene, o-methylstyrene, or dimethylstyrene.

5. A method for forming a cured elastomeric composition comprising mixing together;
   a) an elastomer,
   b) 0.1–50 pbw fully imidized copolymer per 100 pbw said elastomer, said copolymer comprising units contributed from
      1) an alkenyl benzene and
      2) a maleimide, said copolymer having a weight average molecular weight of from about 150,000 to 450,000; and
   c) optionally, an inorganic filler additive, or compounding ingredient; and
   d) optionally, one or more of a softening agent, plasticizer, tackifier, oligomer, lubricant, petroleum hydrocarbon, silicone oil, aromatic oil, naphthenic oil, and paraffinic oil.

6. The method of claim 5 wherein said copolymer is linear.

7. The method of claim 5 wherein said elastomer comprises natural rubber, polyisoprene, polybutadiene, styrene/butadiene rubber, or ethylene/propylene copolymer rubber.

8. The method of claim 5 wherein said alkenyl benzene comprises styrene, α-methylstyrene, tert-butlystyrene, p-methylstyrene, 4-phenylstyrene, m-methylstyrene, o-methylstyrene, or dimethylstyrene.

9. A method for the formation of a cured elastomeric composition comprising a first reaction consisting of reacting a poly(alkenyl benzene-co-maleic anhydride) in the presence of a primary amine in a substantially dry state and in respective weight proportions sufficient to form a poly(maleimide-co-alkenyl benzene) polymer and subsequently mixing said polymer with an elastomer in a ratio of 0.1–50 pbw of said polymer per 100 pbw of said elastomer.

10. The method of claim 9, wherein the monomer for forming the alkenyl benzene moiety of said poly(maleimide-co-alkenyl benzene) is selected from the group consisting of: styrene, α-methylstyrene, tert-butylstyrene, p-methylstyrene, 4-phenylstyrene, 3-methylstyrene, m-methylstyrene, o-methylstyrene, dimethylstyrene, and combinations thereof.

11. The method of claim 9, wherein said primary amine is selected from the group consisting of: alkyl amines; alkyl benzyl amines; alkyl phenyl amines; alkoxybenzyl amines; alkyl aminobenzoates; and alkoxy aniline; containing from 1 to 50 carbon atoms in the alkyl and alkoxy substituents in the primary amine.

12. The method of claim 9, wherein said formation is conducted at temperatures from about 100° C. to about 300° C.

* * * * *